US010287100B2

(12) United States Patent
Weisfelner et al.

(10) Patent No.: US 10,287,100 B2
(45) Date of Patent: May 14, 2019

(54) REMOVABLE COVER ASSEMBLY FOR A BRACKET MOUNTED ROLLER (71) Applicant: THE BOEING COMPANY, Chicago, IL (US)

(72) Inventors: Justin L. Weisfelner, Everett, WA (US); Elizabeth T. Byrd, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 197 days.

(21) Appl. No.: 15/470,457

(22) Filed: Mar. 27, 2017

(65) Prior Publication Data
US 2018/0273300 A1 Sep. 27, 2018

(51) Int. Cl.
B64C 1/14 (2006.01)
B64C 1/20 (2006.01)
B64D 9/00 (2006.01)
B65G 21/08 (2006.01)

(52) U.S. Cl.
CPC ............ B65G 21/08 (2013.01); B64C 1/1415 (2013.01); B64C 1/20 (2013.01); B64D 9/00 (2013.01)

(58) Field of Classification Search
CPC ...... B64C 1/20; B64D 9/00; B64D 2009/006; B65G 21/10; B05C 17/0222; B05C 17/0225
USPC ......... 198/735.3, 735.5, 860.3, 860.5, 480.1, 198/481.1, 338
See application file for complete search history.

(56) References Cited

U.S. PATENT DOCUMENTS

| 2,902,706 | A | * | 9/1959 | Gaetke | ................ | B05C 17/0222 |
| | | | | | | 15/248.2 |
| 3,274,637 | A | * | 9/1966 | Schulze | .............. | B05C 17/0222 |
| | | | | | | 15/230.11 |
| 3,378,872 | A | * | 4/1968 | Frontera | ............. | B05C 17/0222 |
| | | | | | | 15/230.11 |
| 3,654,658 | A | * | 4/1972 | Kovacs | ............... | B05C 17/0222 |
| | | | | | | 15/230.11 |
| 3,721,363 | A | * | 3/1973 | Bressler | .................... | F16J 13/06 |
| | | | | | | 16/230 |
| 3,856,135 | A | * | 12/1974 | Hayakawa | ............. | B65G 21/08 |
| | | | | | | 198/860.5 |
| 3,878,936 | A | * | 4/1975 | Niggemyer | ............ | B65G 21/08 |
| | | | | | | 198/860.2 |
| 4,090,604 | A | * | 5/1978 | Reifert | .................... | B65D 90/54 |
| | | | | | | 198/860.5 |
| 5,864,918 | A | * | 2/1999 | Kosick | ................ | B05C 17/0205 |
| | | | | | | 15/230.11 |

(Continued)

Primary Examiner — Jason L Vaughan
(74) Attorney, Agent, or Firm — Toler Law Group, P.C.

(57) ABSTRACT

A removable cover assembly for a bracket mounted roller is provided and that includes a cover having a contoured bottom to cover a portion of a bracket mounted roller, a pin slidably disposed on the contoured bottom and a retaining tab configured to be slidably received in a slot on a top portion of the roller bracket. The removable cover assembly further includes a lever having a flanged end pivotally coupled to the cover, being pivotal to cause the flanged end to displace the pin, the latch being pivotal between a latched position in which the pin is displaced to cause the retaining tab to be received within the slot to retain the cover assembly to the bracket, and an unlatched position in which the pin is retracted to withdraw the retaining tab from the slot and permit removal of the cover assembly.

20 Claims, 10 Drawing Sheets (56) References Cited

U.S. PATENT DOCUMENTS

| | | | |
|---|---|---|---|
| 6,269,939 B1* | 8/2001 | Lapeyre | B65G 21/00 |
| | | | 198/615 |
| 6,318,545 B1* | 11/2001 | Ross, II | B65G 15/00 |
| | | | 198/497 |
| 9,096,382 B2* | 8/2015 | Laaksonen | B65G 21/10 |
| 9,288,944 B2* | 3/2016 | Coppinger | A01F 12/46 |
| 2006/0130262 A1* | 6/2006 | Visk | B05C 17/02 |
| | | | 15/230.11 |
| 2013/0152980 A1* | 6/2013 | Hues | A46B 17/06 |
| | | | 134/36 |
| 2013/0313083 A1* | 11/2013 | Laaksonen | B65G 21/08 |
| | | | 198/860.5 |
| 2016/0121994 A1 | 5/2016 | Dixon et al. | |

* cited by examiner

REMOVABLE COVER ASSEMBLY FOR A BRACKET MOUNTED ROLLER

BACKGROUND

The present disclosure relates in general to cargo handling systems, such as within an aircraft, and particularly to door sill rollers of the cargo handling systems.

In the lower compartment of airplanes, trip hazards exist and are inherent in the design of the cargo handling system in the lower compartment. The door sill rollers, located in the entry of the door way of the cargo compartments are one such potential hazard (e.g., a person may slip on the roller). More particularly, the door sill rollers can cantilever outboard past the cargo door sill to provide a rolling transition surface for unit load devices to enter the compartment flush with the cargo conveyance plane. Due to the location of the door sill roller location, the rollers present a trip hazard to factory workers, cargo loaders, and other personnel that enter the compartment. In a production environment, the floor is installed in sections, limiting where personnel can step and can increase the trip hazard, such as if a mechanic's foot comes in contact with a roller. Moreover, in service or during maintenance operations, a stairway to the cargo compartment can leave a gap in front of the entry way. During this time, the door sill rollers may be inadvertently used for support as crews enter and exit the cargo area.

In order to address the moving rollers, factory workers often use tape to prevent rotation of the rollers. This taping of the rollers has led to problems where residue from the tape remains on the rollers or is not completely removed. If the tape is not applied correctly or torn, the roller may still be able to rotate. Thus, in conventional cargo handling systems, it is difficult to secure the door sill rollers.

SUMMARY

In one embodiment, a removable cover assembly for a bracket mounted roller is provided. The removable cover assembly includes a cover having a contoured bottom to cover a portion of a bracket mounted roller, a pin slidably disposed on the contoured bottom and a retaining tab configured to be slidably received in a slot on a top portion of the roller bracket. The removable cover assembly further includes a lever having a flanged end pivotally coupled to the cover, being pivotal to cause the flanged end to displace the pin, the latch being pivotal between a latched position in which the pin is displaced to cause the retaining tab to be received within the slot to retain the cover assembly to the bracket, and an unlatched position in which the pin is retracted to withdraw the retaining tab from the slot and permit removal of the cover assembly.

In another embodiment, a roller cover is provided that includes a cover portion configured to cover a roller of a bracket mounted roller assembly and a locking mechanism configured to couple the cover portion in a locked position to a portion of the bracket mounted roller assembly. The locking mechanism has a locking pin slidably engaging the portion of the bracket mounted roller assembly in the locked position.

In another embodiment, a removable safety cover is provided that includes a cover portion configured to cover a roller of an aircraft cargo sill roller assembly in a non-contact relationship and a locking mechanism configured to couple to a single stud tie down of the aircraft cargo sill roller assembly. The locking mechanism has a sliding pin with a retaining tab to engage a portion of the single stud tie down to secure the cover portion to the aircraft cargo sill roller assembly in a locked fixed position.

DETAILED DESCRIPTION

The following detailed description of certain embodiments will be better understood when read in conjunction with the appended drawings. To the extent that the figures illustrate diagrams of different components of various embodiments, the components are not necessarily indicative of the division between hardware implementations. Thus, for example, one or more of the components may be implemented in a single piece of hardware or multiple pieces of hardware. It should be understood that the various embodiments are not limited to the arrangements and instrumentality shown in the drawings.

Figure 1:
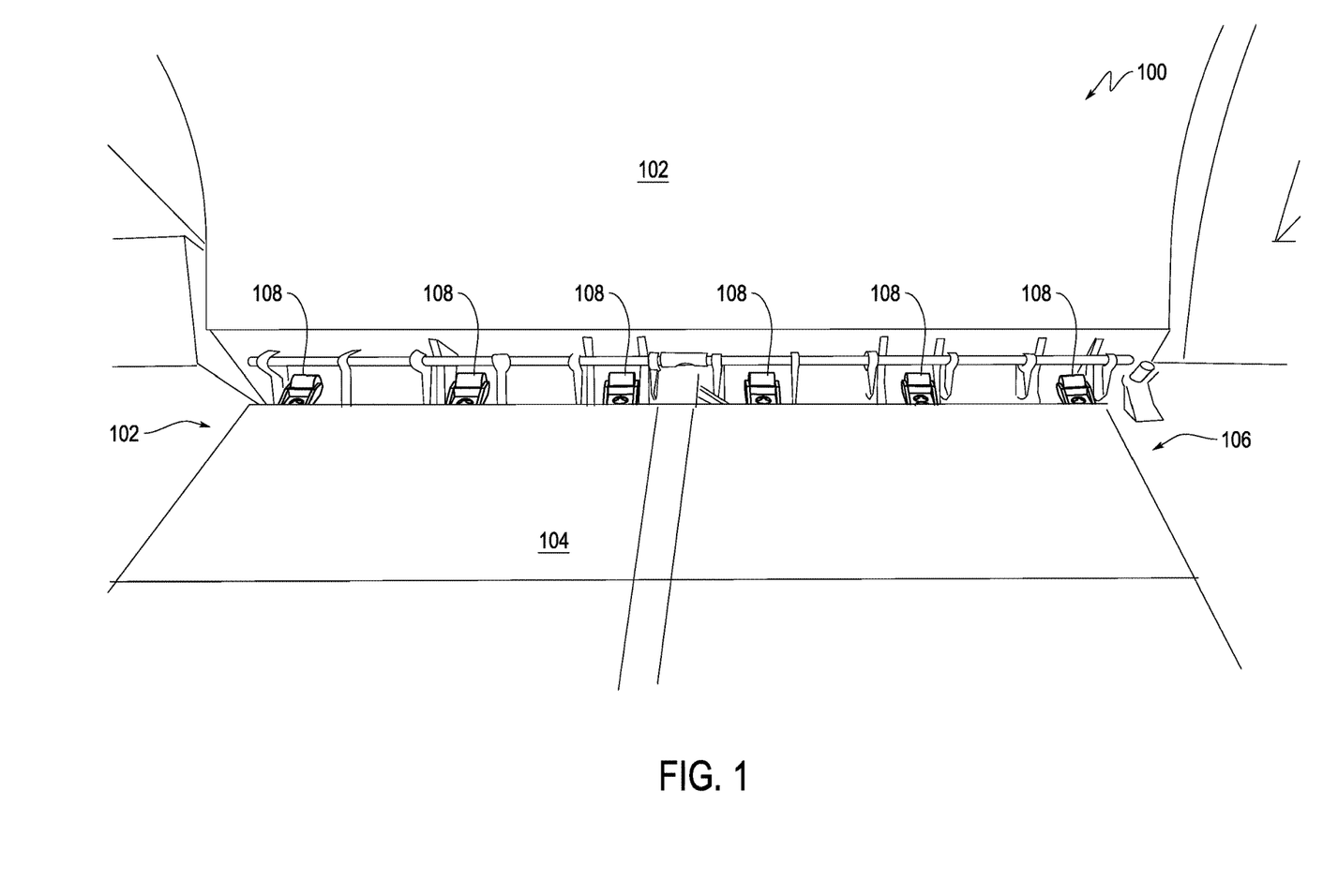
FIG. 1 is a diagram of a cargo bay in which various embodiments may be implemented.

Various embodiments include systems and methods for providing a removable cover assembly for a bracket mounted roller. In some embodiments, a roller cover is a removable protective tool that provides a platform to step on, eliminating step contact with the moving roller. The roller cover may include a locking mechanism that secures to a tie down fitting on top of the roller assembly and can quickly latch and unlatch with one handed operation. By practicing one or more embodiments, trip/fall hazards in cargo handling systems may be mitigated, such as when personnel are entering and exiting the aircraft cargo area to load or unload the aircraft cargo bays, such as the cargo bay 100 illustrated in FIG. 1. As can be seen in FIG. 1, adjacent to the cargo door 102 along a floor portion of the cargo bay 100 is a cargo handling system that may include plural rollers (not shown) along both the floor 104 of the cargo bay 100 and plural rollers 108 extending along an outer side 106 (also referred to as the sill) of the floor 104 towards the cargo door 102.

Figure 2:
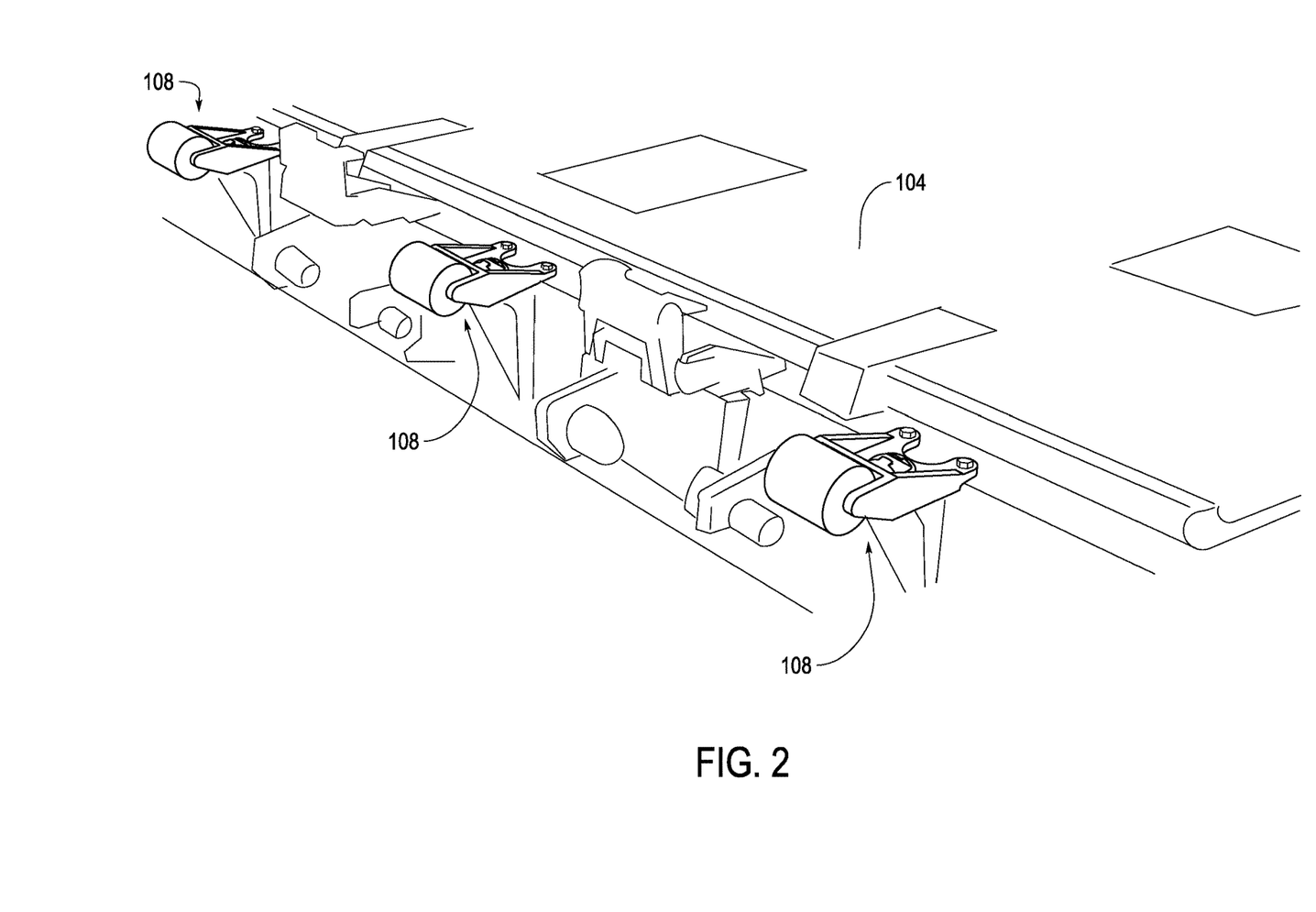
FIG. 2 is a diagram of a portion of a floor of a cargo bay having cargo rollers that may be covered in accordance with various embodiments.
Figure 3:
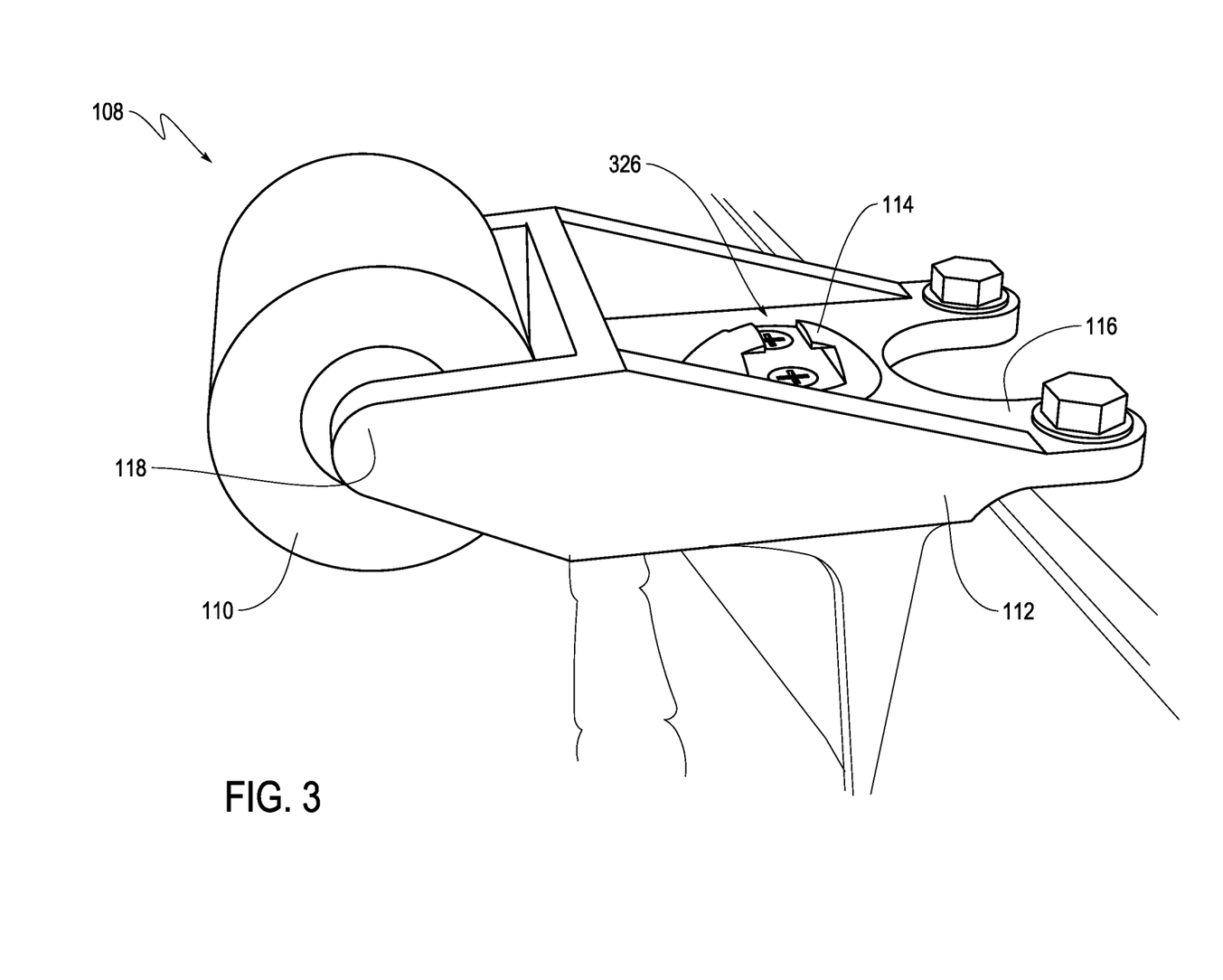
FIG. 3 is a diagram of a bracket mounted cargo roller that may be covered in accordance with various embodiments.

As can be seen more clearly in FIGS. 2 and 3, plural rollers 108 are spaced apart along the outer side 106 of the floor 104 to facilitate movement of cargo into and out of the cargo bay 100. In the illustrated embodiment, the rollers 108 are door sill rollers configured as bracket mounted rollers having a roller wheel 110 mounted to the floor 104 of the cargo bay 100 by a bracket mounting arrangement, illustrated as a mounting arm 112. This mounting arrangement causes the roller wheel 110 to be spaced a distance from the outer side 106 of the floor 104 of the cargo bay 100. As should be appreciated, other configurations and arrangements of rollers 108 may be provided and which may be covered in accordance with one or more embodiments disclosed herein. For example, one or more embodiments may be configured to cover different shapes and sizes of rollers 108.

The mounting arm 112 of the rollers 108 generally defines a frame portion that includes a tie down 114 coupled with or forming part of the mounting arm 112. For example, as can be seen in FIG. 3, the tie down 114 is provided on a top surface 116 of the mounting arm 112. In various embodiments, the tie down 114 is used to secure cargo within the cargo bay 100 using tie down securing techniques in the aircraft industry (e.g. using a spring plunger snapped down to lock a cargo strap).

Figure 4:
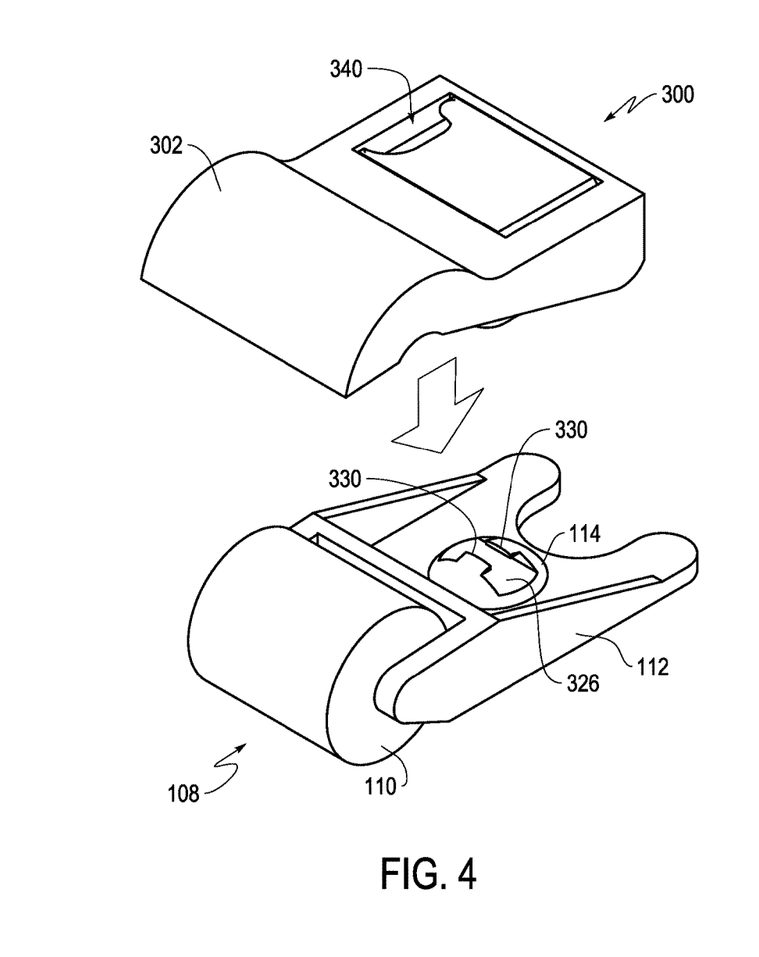
FIG. 4 is a diagram of a cover assembly in an alignment position in accordance with an embodiment.
Figure 5:
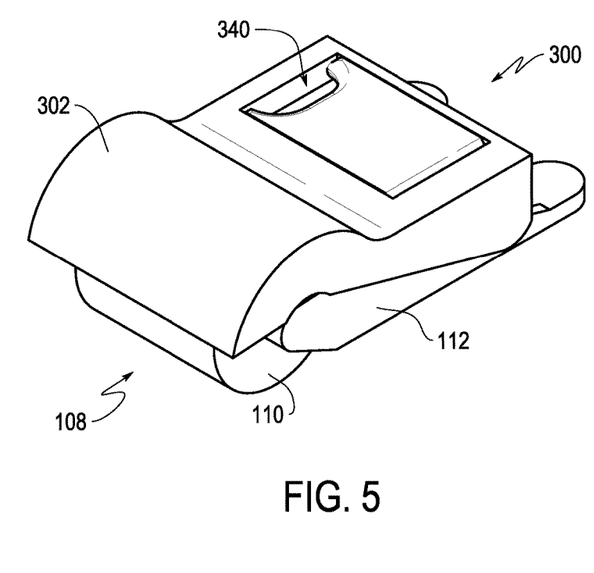
FIG. 5 is a diagram of a cover assembly in an installed position in accordance with an embodiment.

FIGS. 3 and 4 illustrate a removable cover assembly 300 in accordance with an embodiment that is configured to cover a portion of the roller 108, particularly at least the upper portion of the roller wheel 110 so as to not be exposed to individuals walking in and out of, as well as within, the cargo bay 100. FIG. 3 illustrates a pre-installation position of the cover assembly 300 relative to the roller 108 and FIG. 4 illustrates an installed position of the cover assembly 300 secured to the roller 108. As described in more detail herein, the cover assembly 300 is configured to be secured to the roller 108 by a locking arrangement to couple the cover assembly 300 to the tie down 114. As can be seen, the cover assembly 300 is sized and shaped to fit over and cover the roller 108, including at least a portion of the roller wheel 110 and the mounting arm 112. As such, in operation, when the cover assembly 300 is coupled to the roller 108, movement of the roller wheel 110 from above, such as when a person steps on that portion, is prevented by the cover assembly 300.

Figure 6:
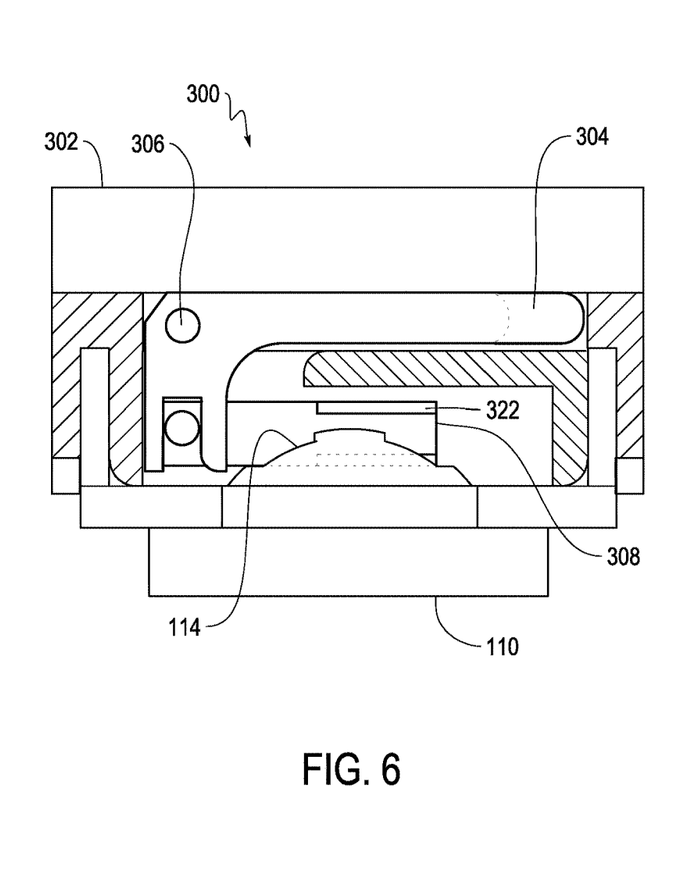
FIG. 6 is a diagram of a cover assembly in a locked position in accordance with an embodiment.
Figure 7:
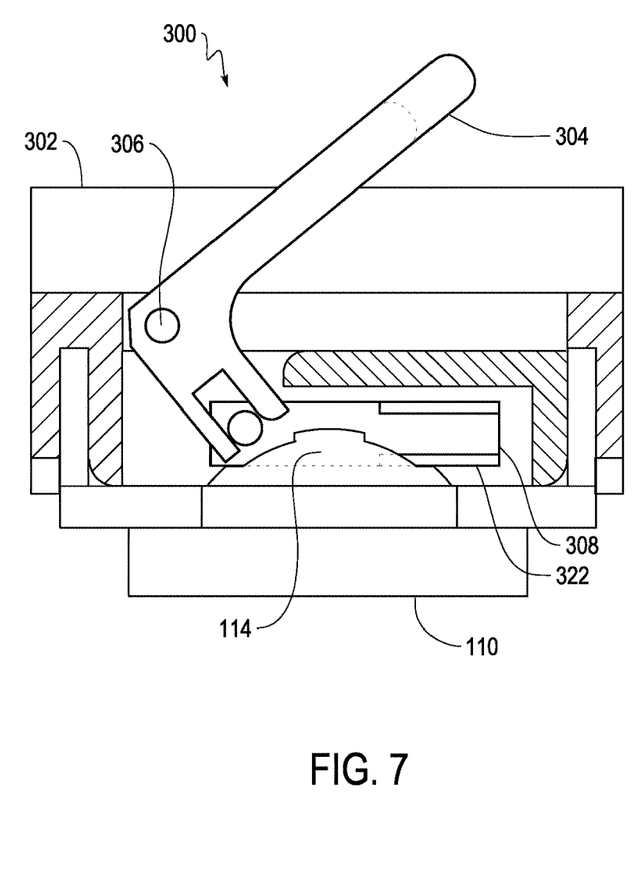
FIG. 7 is a diagram of a cover assembly in an unlocked position in accordance with an embodiment.
Figure 8:
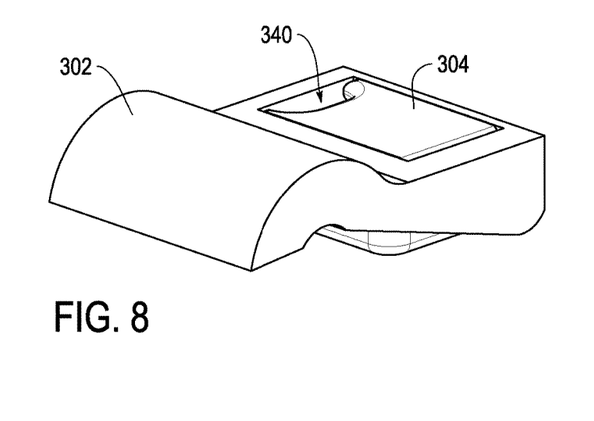
FIG. 8 is a top perspective view of a cover assembly in accordance with an embodiment.
Figure 9:
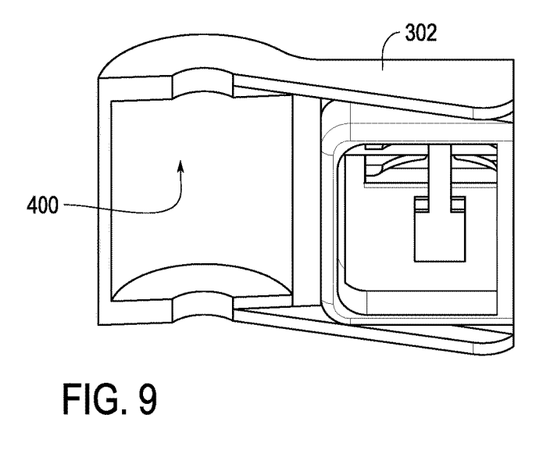
FIG. 9 is a bottom perspective view of a cover assembly in accordance with an embodiment.
Figure 10:
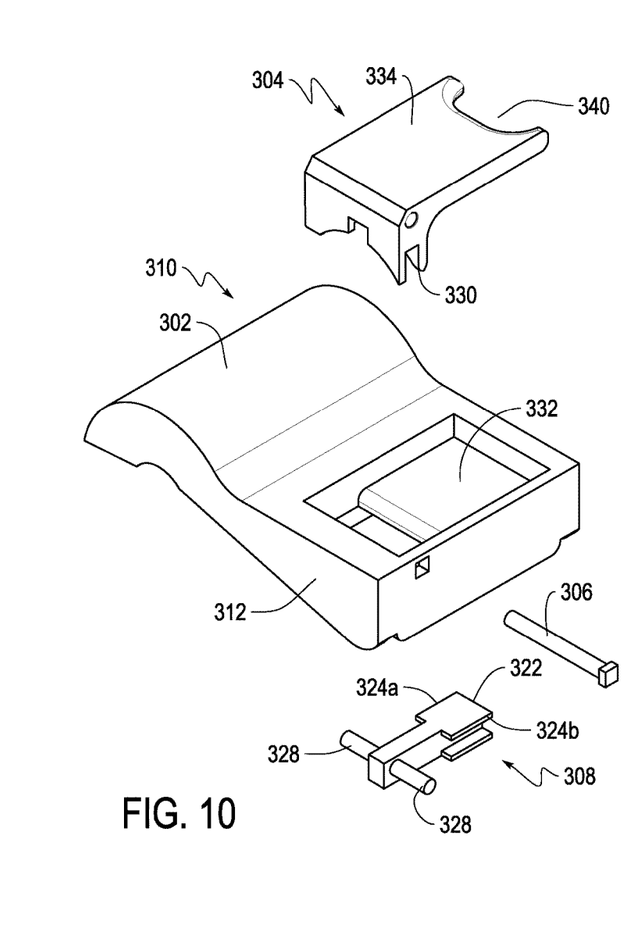
FIG. 10 is an exploded view of a cover assembly in accordance with an embodiment.

With reference now to FIGS. 4-12, the cover assembly 300 is configured in the illustrated embodiment as a cargo door sill roller safety cover having a cover 302 (also referred to as a safety cover), a latch 304, a shaft 306 and a locking pin 308 (wherein at least some or all of these components define a locking mechanism as described herein). More particularly, FIG. 6 illustrates a locked position of the cover assembly 300, FIG. 7 illustrates an unlocked position of the cover assembly 300 and FIG. 10 illustrates an exploded view of the cover assembly 300 showing the component parts thereof. As should be appreciated, the various components may be coupled together in different suitable ways, and in some embodiments, one or more of the component parts may be integrally formed as a single unitary piece.

Figure 11:
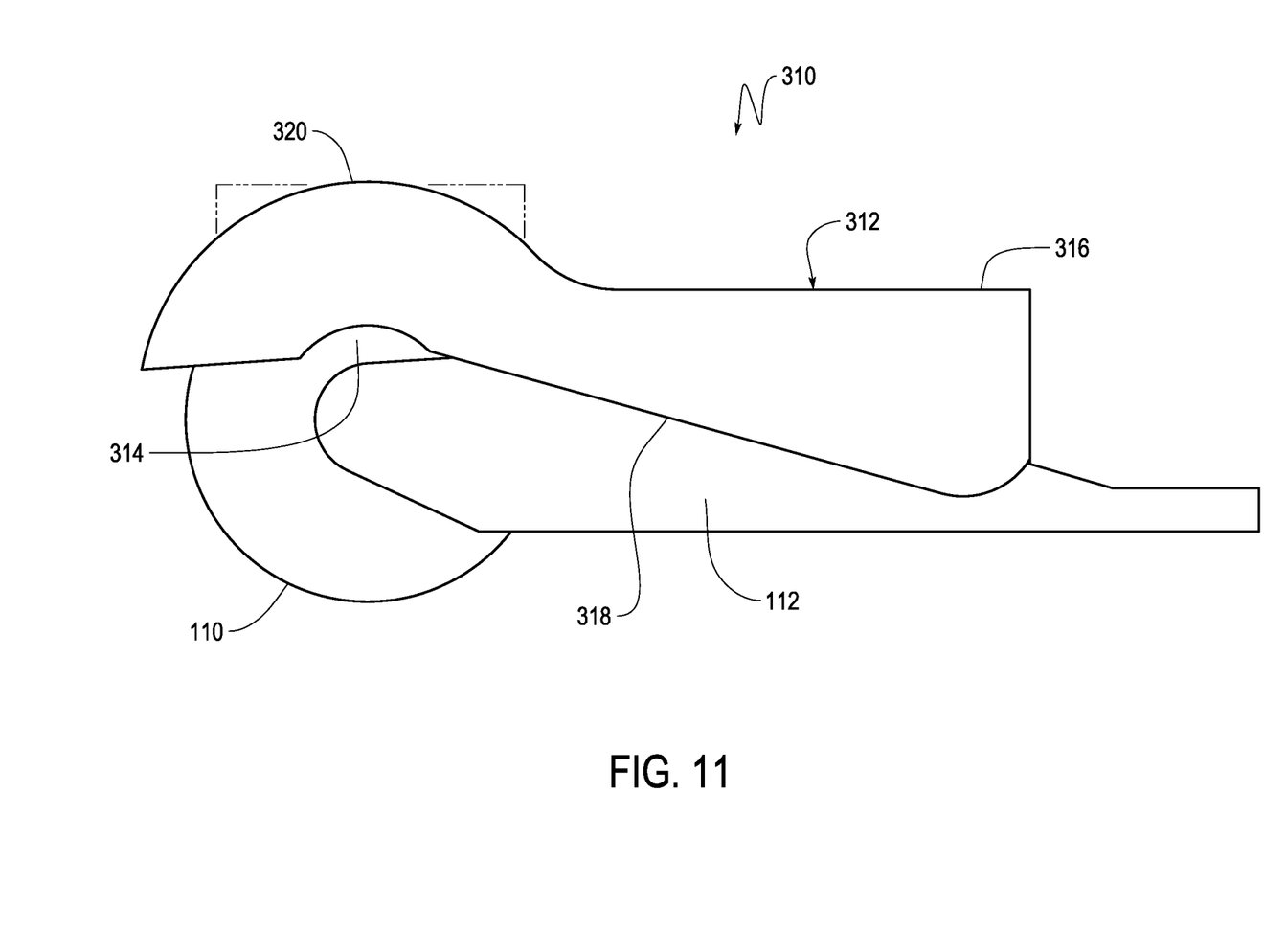
FIG. 11 is a side plan view of a cover assembly in accordance with an embodiment.

The cover assembly 300 is configured to fit in an abutting arrangement (e.g., snugly) over the cargo roller 108 including both the roller wheel 110 and a roller axle 118. For example, the cover 302 includes a roller cover portion 310 and a base portion 312 that are sized and shaped to be positioned above the roller wheel 110 and abut against the mounting arm 112 (e.g., mounting bracket). As can be seen in FIG. 11, the cover assembly 300 includes a contoured bottom forming part of a contoured (illustrated as arcuate) shaped roller cover portion 310 (having a hollow cavity 400 thereunder as shown in FIG. 9 to receive the roller wheel 110 therein) and base portion 312 having a planar shaped top. When engaged, the cover assembly 300 covers at least a top surface of the roller wheel 110 and a top surface the mounting arm 112. The roller cover portion 310 may include cutout portions 314 sized and shaped to fit over the roller axle 118. Additionally, the base portion 312 includes the substantially flat upper surface and an angled lower surface 318 that angles from the roller wheel 110 to a portion of the mounting arm 112 that is coupled to the cargo bay floor 104.

As should be appreciated, other shapes and sizes are contemplated, for example, based on the configured of the roller 108. Additionally, variations and modifications are contemplated by this disclosure. For example, part of the roller cover portion 310, such as part of an upper surface 320 may be formed in a planar arrangement (such as shown by the dashed lines in FIG. 11) to define a flat top, which can facilitate stepping thereon. In some embodiments, the upper surface 320 is curved or contoured, but to a lesser degree than the side surfaces.

In operation, the cover assembly 300 is configured to be locked into place via the latch 304 that defines part of a latching mechanism for securing the cover assembly 300 to the roller 108. In this locked position, the cover assembly 300 is prevented from movement relative to the roller 108, such as by accidentally getting kicked off. In particular, the cover assembly 300 is configured to lock to the roller 108 itself, which in various embodiments, is a locking arrangement with the tie down 114. For example, as described in more detail herein, the cover assembly 300 is configured to engage with and lock to a portion of the tie down 114. The cover assembly 300 may be configured differently to allow for coupling to different tie down fittings on different types of door sill rollers (or cargo rollers), such as on different aircraft. Various embodiments, thus, may be modified to provide a cargo entry roller locking removable safety cover that defines a removable protective tool that provides a platform to step on, eliminating contact with the moving roller wheel 110 of the roller 108. The cover assembly 300 is configured to be arranged on the roller 108 to completely protect the roller assembly unit by covering the roller wheel 110 and the roller axle 118. This configuration of the cover assembly 300 prevents inadvertent contact with the roller 108, such as from crews working in the cargo compartment (e.g., cargo bay 100) and mitigates the tripping hazard present if the roller wheel 110 is exposed.

Specifically, the cover assembly 300 includes a locking arrangement having the locking pin 308 (configured as a sliding pin) that is activated by the latch 304 to slide or move an engagement portion 322 of the cover assembly 300 into locking engagement with a portion of the tie down 114 as shown in FIGS. 6 and 7. For example, the engagement portion 322 includes upper and lower tabs 324a, 324b that are caused to slide or move such that the lower tab 324b engages with a complementary slot 326 of the tie down 114. In particular, as the latch 304 is moved from an unlocked position (as shown in FIG. 7) to a locked position (as shown in FIG. 6), the rotational movement of the end of the latch 304, having slots 330 (to define a flanged end) engaged with arms 328 of the locking pin 308, causes translational movement (sliding movement) of the locking pin 308 such that the upper and lower tabs 324a, 324b move and the lower tab 324b engages within the complementary slot 326 of the tie down 114 and is prevented from lifting off by shoulder portions 330 of the tie down 114.

The latch 304 may be configured as a lever having a flanged end pivotally coupled to the safety cover 302, being pivotal to cause the flanged end to displace the locking pin 308. The latch 304 is, thus, pivotal between a latched position (defining a locked position) in which the locking pin 308 is displaced to cause the retaining tab 324*b* to be received within the slot 326 of the roller 108 (which in one embodiment is the slot 326 of the tie down 114) to retain the cover assembly 300 to the roller, and an unlatched position (defining an unlocked position) in which the locking pin 308 is retracted to withdraw the retaining tab 324*b* from the slot 326 and permit removal of the cover assembly 300.

Figure 12:
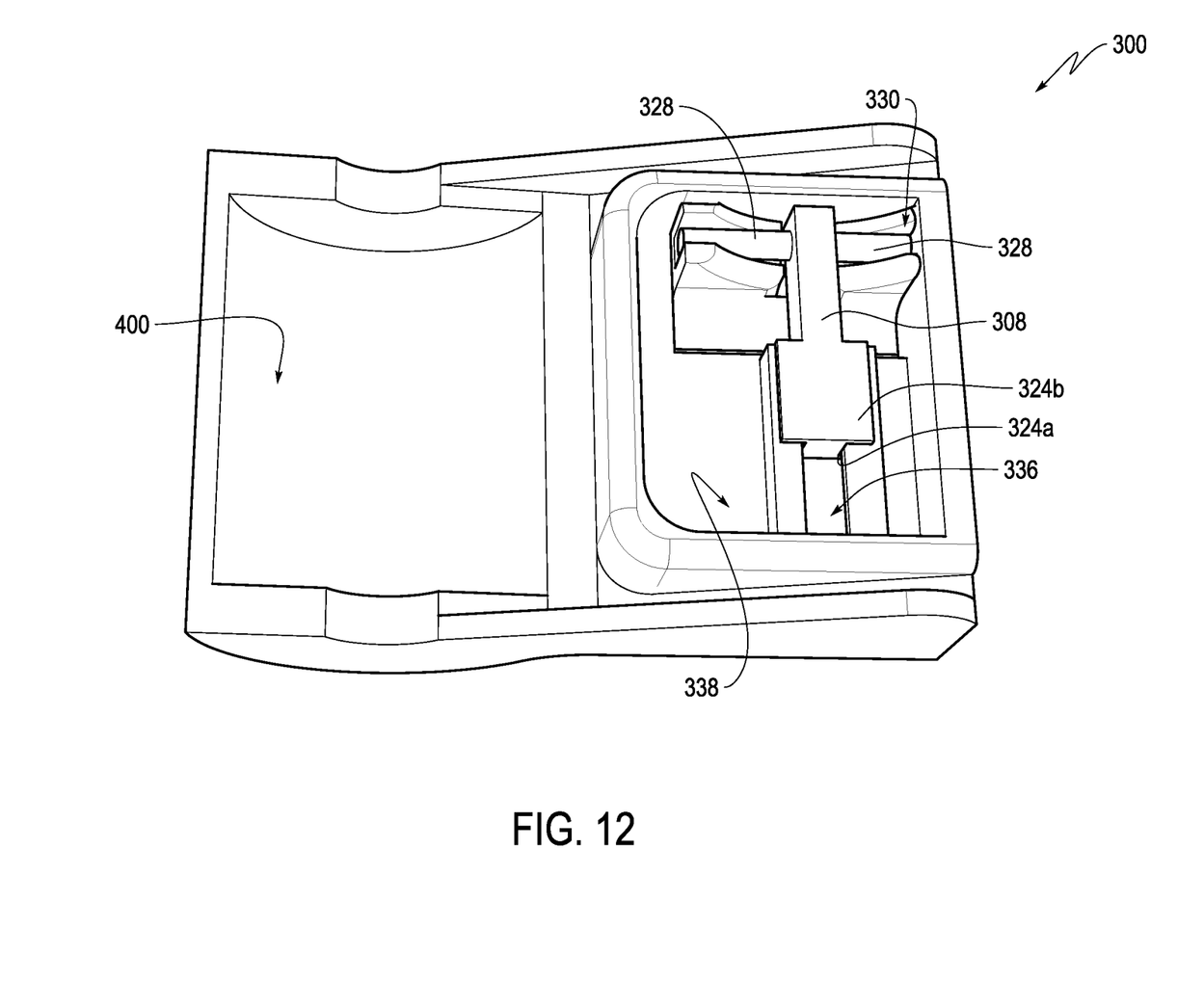
FIG. 12 is a perspective bottom view of a cover assembly in accordance with an embodiment.

In one embodiment, the upper tab 324 is configured to slide along a groove 336 of the cover assembly 300 (see FIG. 12). The groove 336 is formed in an engagement area 338 within a cavity of hollow area of the base portion 312. Thus, in operation, when the latch 304 is moved from an unlocked position to a locked position, the upper tab 324*a* is caused to move along the groove 336 and aligns the lower tab 324*b* to engage within the slot 326 of the tie down 114 (by sliding within the slot 326 of the tie down 114). It should be noted that the engagement area 338 in various embodiments includes a cutout (such as a circular cutout) to allow the tie down 114 to be received therein when engaged and latched. Thus, the latch 304 drives the locking pin 308 that is sized and shaped (fitted) for the tie down 114 (e.g., standard single stud tie down) into the complementary slot 326 for locking engagement thereto. In the locked position, the portion of the roller 308 that includes the tie down 114 is covered by the engagement area 338 of the cover assembly 300.

Different configurations of the locking pin 308 may be provided. For example, the locking pin 308 may be configured as a trip pin that is caused to move by movement of the latch 304. As another example, an arrangement may be provided wherein the latch 304 trips a clevis pin. Thus, the locking pin 308 may be configured differently, for example, sized and shaped differently to engage different types of tie downs, such as different types of aircraft single stud tie downs located on top of a roller assembly.

The locking pin 308 is, thus, slidably disposed on the bottom portion of the safety cover 302, having the tabs 324*a*, 324*b* configured as retaining tabs configured to be slidably received in the tie down 114, at a portion of the roller bracket, which in one embodiment is the slot 326 of the tie down 114. However, in other configurations of bracket mounted rollers, the cover assembly 300 may be configured to engage with different portions of the bracket mounted rollers, such as directly to a surface of the bracket mounted roller.

In the illustrated embodiments, the tab 324*a* and the tab 324*b* each protrude horizontally from opposing sides of the locking pin 308, and are generally parallel with the top of the cover assembly 300. However, the tabs 324*a*, 324*b* may protrude in different directions and take different shapes. For example, instead of being parallel and generally cylindrical in shape, the tabs 324*a*, 324*b* may be angled and have a generally rectangular shape.

The cover assembly 300 is, thus, positioned on the roller 108 and then the latch 304 is lowered, securing the locking pin 308 in the tie down 114, such that the lower portion of the engagement area 338 (e.g., lower ends of the walls that form the engagement area 338) rest or abut against the floor 104 of the cargo bay 100. Thus, a safe stepping area is formed over the roller 108.

It should be noted that the latch 304 in the locked position is configured to be flush with the top portion of the cover assembly 300, which in the illustrated embodiment is provided by a cavity 332 configured to receive therein a lever 334 (handle portion) of the latch 304 to thereby alleviate any tripping hazards. For example, in one embodiment, the lever 334 is pivotal to a latched or locked position in which the lever 334 is generally flush with the top of the cover assembly 300 (which may include a detent tab that slides into the lever 334). In an unlatched or unlocked position, the lever 334 is raised above the cover assembly 300. Thus, the lever 334 in one embodiment is pivotal to a latched or locked position in which the lever 334 is recessed within an opening in the cover assembly 300 defined by the cavity 332. The flanged end of the latch 304 extends through the opening in the cover assembly 300 to the bottom portion of the cover assembly 300, to enable the flanged end to cause displacement of the locking pin 308. The lever 334 in some embodiments includes a cutout portion 340 sized to allow one or more fingers to be received therein to facilitate raising the lever 334 when in the latched or locked position.

Thus, in operation, the latch 304 is pivotal about the shaft 306 between the latched position in which the flanged end of the latch 304 displaces the locking pin 308 to cause the tab 324*b* (configured as a retaining tab) to be slidably received within the retaining slot on the roller bracket (such as the slot 326 of the tie down 114) to retain the cover assembly 300, and an unlatched position in which the flanged end of the latch 304 retracts the locking pin 308 to cause the tab 324*b* to be withdrawn from the slot 326 to permit removal of the cover assembly 300. For example, a configuration is defined having a retaining pin transversely disposed in an end portion of the locking pin 308, wherein pivotal movement of the lever 334 causes the flanged end to engage the retaining pin to cause displacement of the locking pin 308.

The use of the cover assembly 300 may be performed (such as with as single hand) in simple manner. For example, as described herein, to engage the cover assembly 300, the latch 304 is lowered, engaging the locking pin 308 to the tie down 114 and then the cover assembly 300 can be removed to remove cover assembly 300, by raising the latch 304, thereby disengaging the locking pin 308 from the tie down 114 and then the cover assembly 300 can be removed. The cover assembly 300 is, thus, configured in such a way that the cover assembly 300 can be quickly latched and unlatched with one handed operation. The ease of use of the cover assembly 300 is intended to be ergonomically efficient, as well as help facilitate the use of the cover assembly 300 in either a production or maintenance setting.

In various embodiments, the cover assembly 300 may be configured as a removable cover assembly for any type of bracket mounted roller, such that the safety cover 302 has a bottom portion contoured to cover a portion of the bracket mounted roller (e.g., the roller 108), including a portion of the roller wheel 110 and the mounting arm 112. In various embodiments, the safety cover 302 is sized and shaped to cover the roller wheel 110, but not be in contact with the roller wheel 110 (i.e., in a non-contact relationship and spaced apart from the outer circumference of the roller wheel 110).

Thus, various embodiments provide a safety cover for a cargo roller (particularly a cargo sill roller) that engages with and locks to the cargo roller. For example, as described herein, the safety cover includes a sliding mechanism for engaging a slotted feature of the cargo roller that enables single handed operation to latch and unlatch the safety cover from the cargo roller. With the safety cover, a cantilevered cargo sill roller may be safely covered to allow stepping on areas that otherwise would have to be avoided, by stepping over the cargo rollers.

The safety cover may be used in combination with different types of cargo rollers, such as by engaging with the tie down built into the frame of the cargo rollers. The simple sliding operation of the safety cover to releasably engage with the cargo roller provides a quick and convenient safety tool when working in or using the cargo area of an aircraft. For example, in operation, the locking mechanism in accordance with various embodiments may be provided and configured to couple to a single stud tie down of the aircraft cargo sill roller assembly, with the locking mechanism having a sliding pin with a retaining tab to engage a portion of the single stud tie down to secure the cover portion to the aircraft cargo sill roller assembly in a locked fixed position.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 13:
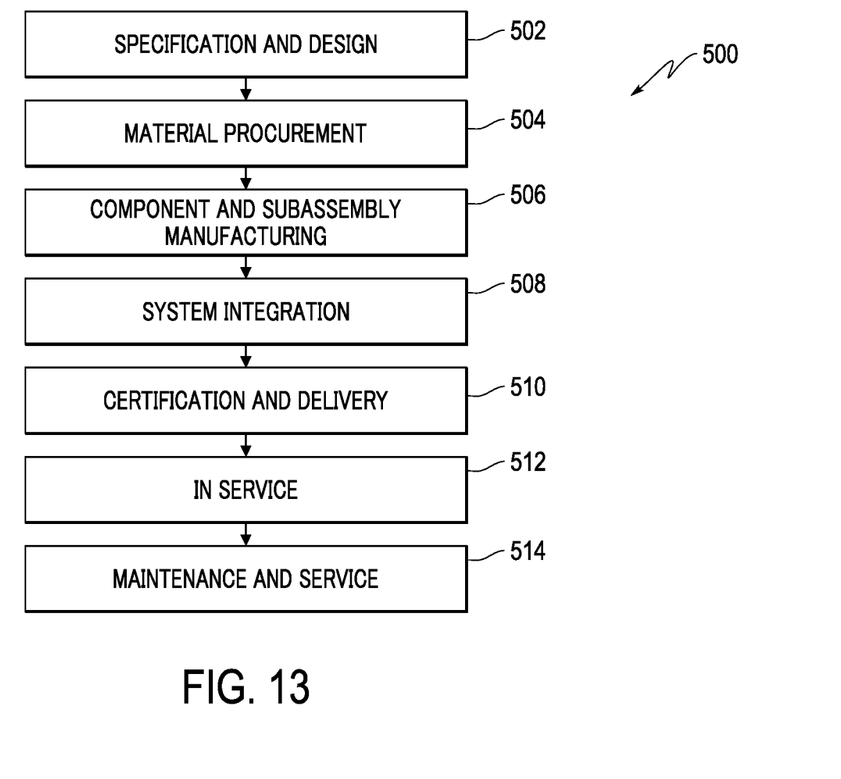
FIG. 13 is a block diagram of an aircraft production and service methodology.
Figure 14:
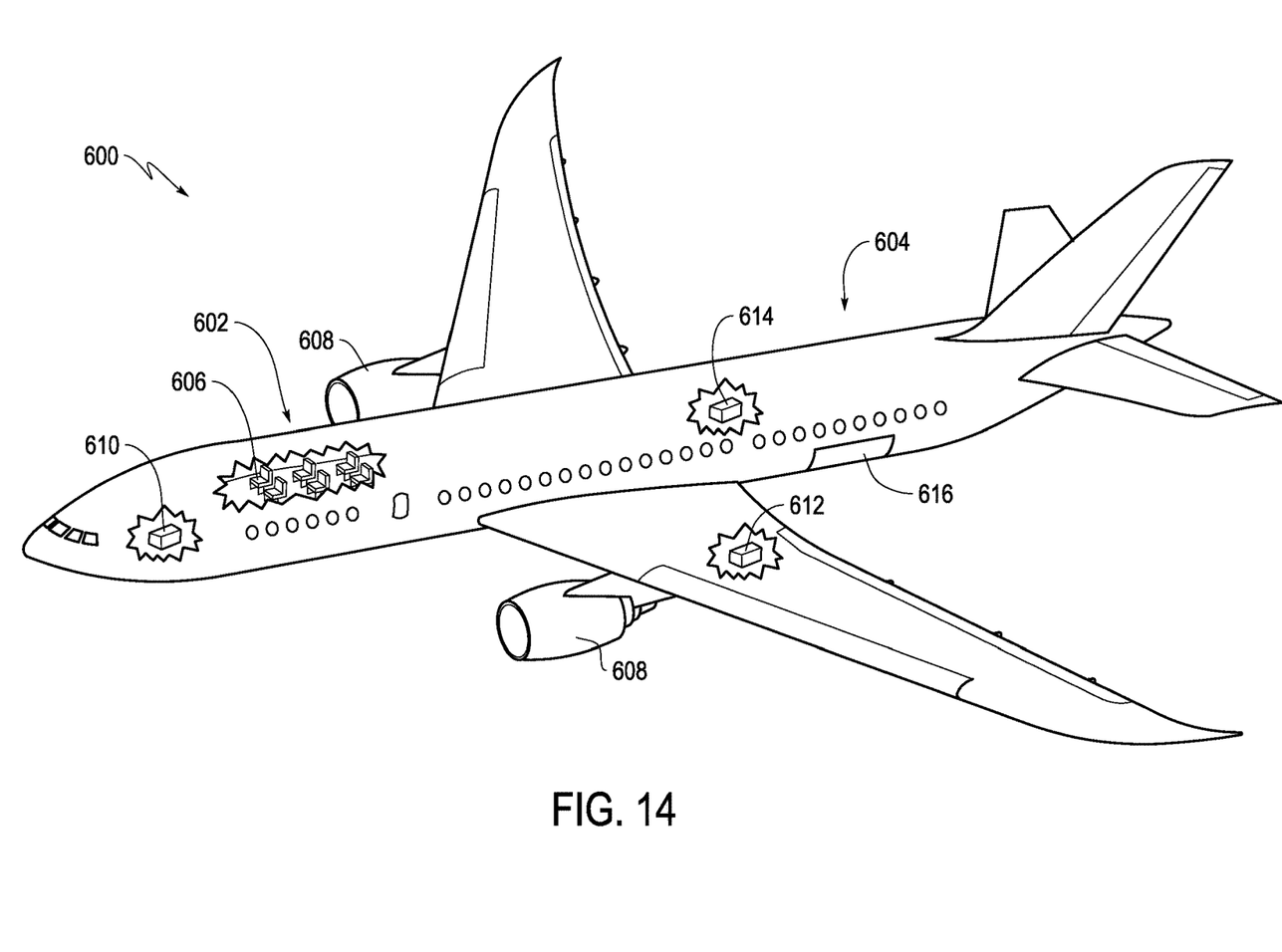
FIG. 14 is a schematic perspective view of an aircraft.

Examples of the disclosure may be described in the context of an aircraft manufacturing and service method 500 as shown in FIG. 13 and an aircraft 600 as shown in FIG. 14. During pre-production, illustrative method 500 may include specification and design 502 of the aircraft 600 and material procurement 504. During production, component and subassembly manufacturing 506 and system integration 508 of the aircraft 600 take place. Thereafter, the aircraft 600 may go through certification and delivery 510 to be placed in service 512. While in service by a customer, the aircraft 600 is scheduled for routine maintenance and service 514 (which may also include modification, reconfiguration, refurbishment, and so on).

Each of the processes of the illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 14, the aircraft 600 produced by the illustrative method 500 may include an airframe 602 with a plurality of high-level systems 604 and an interior 606. Examples of high-level systems 604 include one or more of a propulsion system 608, an electrical system 610, a hydraulic system 612, and an environmental system 614. Any number of other systems may be included. Although an aerospace example is shown, the principles may be applied to other industries, such as the automotive industry.

Apparatus and methods shown or described herein may be employed during any one or more of the stages of the manufacturing and service method 500. For example, components or subassemblies corresponding to component and subassembly manufacturing 506 may be fabricated or manufactured in a manner similar to components or subassemblies produced while the aircraft 600 is in service. Also, one or more aspects of the apparatus, method, or combination thereof may be utilized during the production states 506 and 508, for example, by substantially expediting assembly of or reducing the cost of an aircraft 600. Similarly, one or more aspects of the apparatus or method realizations, or a combination thereof, may be utilized, for example and without limitation, while the aircraft 600 is in service, e.g., maintenance and service 514. For example, in some embodiments, the method 500 may include accessing a cargo door 616 into a cargo area that includes cargo rollers that may be covered by one or more embodiments.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An apparatus comprising:
a cover configured to couple to a portion of a bracket mounted roller;
a pin slidably coupled to the cover, wherein the pin comprises a retaining tab configured to be slidably received in a slot on a portion of the bracket mounted roller; and
a lever pivotally coupled to the cover, wherein the lever is configured to pivot between a latched position, wherein the lever is configured to position the pin in a first position while the lever is in the latched position, wherein the lever is configured to position the pin in a second position while the lever is in the unlatched position, wherein the retaining tab is configured to be positioned in the slot while the pin is in the first position, and wherein the retaining tab is configured to be positioned out of the slot while the pin is in the second position.

2. The apparatus of claim 1, wherein the pin further comprises a second retaining tab, and wherein the retaining tab and the second retaining tab are configured to have a portion of the bracket mounted roller positioned between retaining tab and the second retaining tab while the pin is in the first position.

3. The apparatus of claim 1, wherein the first position and the second position are along a first axis, and wherein the lever rotates about a second axis while pivoting from the latched position to the unlatched position, the second axis distinct from the first axis.

4. The apparatus of claim 1, wherein an axis of the lever is substantially parallel with a surface of the cover in the first position, and wherein the axis of the lever is non-parallel with the surface in the second position.

5. The apparatus of claim 1, wherein the cover defines an opening, and wherein a portion of the lever is configured to pass through the opening while the lever is in the second position.

6. The apparatus of claim 1, wherein lever includes a flanged portion, and wherein the flanged portion is configured to cause the pin to move from the first position to the second position responsive to the lever moving from the latched position to the unlatched position.

7. The apparatus of claim 6, wherein the pin comprises a retaining member, and wherein the flanged portion of the lever is rotatably coupled to the retaining member.

8. The apparatus of claim 1, wherein the cover is shaped to receive the portion of the bracket mounted roller.

9. The apparatus of claim 1, wherein the bracket mounted roller includes an aircraft cargo roller.

10. The apparatus of claim 1, wherein the lever includes a portion sized to receive one or more fingers.

11. The apparatus of claim 1, wherein the cover includes a cutout on a first side and a second side to accommodate a roller axle of the bracket mounted roller.

12. An apparatus comprising:
a cover configured to couple to a portion of a bracket mounted roller; and
a locking mechanism coupled to the cover, wherein the locking mechanism is configured to move a locking pin between a locked position and an unlocked position, wherein the locking pin is configured to couple the cover to the bracket mounted roller by engaging the portion of the bracket mounted roller while in the locked position.

13. The apparatus of claim 12, wherein the locking pin is configured to slide between the locked position and the unlocked position.

14. The apparatus of claim 12, further comprising a lever coupled to the locking mechanism and configured to cause the locking pin to move between the locked position and the unlocked position.

15. The apparatus of claim 12, wherein the locking pin has a retaining tab that is configured to engage a top portion of the bracket mounted roller.

16. The apparatus of claim 12, wherein the cover comprises a substantially flat portion adjacent to the locking mechanism, wherein the locking pin moves along a first axis when moving between the locked position and the unlocked position, and wherein the substantially flat portion is parallel with the first axis.

17. The apparatus of claim 12, wherein the cover has a portion having an arcuate shape.

18. The apparatus of claim 12, wherein the cover is shaped to receive the portion of the bracket mounted roller.

19. The apparatus of claim 12, wherein the cover does not directly contact the bracket mounted roller while the locking pin is engaging the portion of the bracket mounted roller.

20. An apparatus comprising:
a cover configured to couple to a roller of an aircraft cargo sill roller assembly; and
a locking mechanism coupled to the cover, the locking mechanism configured to move a locking pin between a locked position and an unlocked position, wherein the locking pin is configured to couple the cover to the aircraft cargo sill roller assembly by engaging a portion of the aircraft cargo sill roller assembly while in the locked position.

* * * * *

UNITED STATES PATENT AND TRADEMARK OFFICE
CERTIFICATE OF CORRECTION

Page 1 of 1

PATENT NO. : 10,287,100 B2
APPLICATION NO. : 15/470457
DATED : May 14, 2019
INVENTOR(S) : Justin L. Weisfelner and Elizabeth T. Byrd It is certified that error appears in the above-identified patent and that said Letters Patent is hereby corrected as shown below:

On the Title Page

In the Abstract:
Line 2, after "having a" insert --bottom portion--.
Line 3, delete "bottom".
Line 4, after "disposed on" delete "contoured".
Line 4, after "bottom" insert --portion of the cover having--.

In the Claims

Claim 1, Line 10, after "a latched position," insert --and an unlatched position--.

Signed and Sealed this
Twenty-fifth Day of June, 2019

Andrei Iancu
*Director of the United States Patent and Trademark Office*